United States Patent
Rieken et al.

(10) Patent No.: US 10,929,313 B2
(45) Date of Patent: Feb. 23, 2021

(54) METHOD FOR SECURELY AND EFFICIENTLY ACCESSING CONNECTION DATA

(71) Applicant: Uniscon Universal Identity Control GmbH, Munich (DE)

(72) Inventors: Ralf Rieken, Munich (DE); Michael Kellermann, Munich (DE); Hubert Jäger, Pullach (DE); Edmund Ernst, Munich (DE)

(73) Assignee: UNISCON UNIVERSAL IDENTITY CONTROL GMBH, München (DE)

( * ) Notice: Subject to any disclaimer, the term of this patent is extended or adjusted under 35 U.S.C. 154(b) by 127 days.

(21) Appl. No.: 15/907,493

(22) Filed: Feb. 28, 2018

(65) Prior Publication Data

US 2018/0196761 A1 Jul. 12, 2018

Related U.S. Application Data

(63) Continuation of application No. PCT/EP2016/070053, filed on Aug. 25, 2016.

(30) Foreign Application Priority Data

Aug. 31, 2015 (DE) .......... 10 2015 114 544

(51) Int. Cl.
*G06F 21/00* (2013.01)
*H04L 29/06* (2006.01)
(Continued)

(52) U.S. Cl.
CPC ...... *G06F 12/1408* (2013.01); *G06F 12/1458* (2013.01); *H04L 9/0618* (2013.01);
(Continued)

(58) Field of Classification Search
CPC combination set(s) only.
See application file for complete search history.

(56) References Cited

U.S. PATENT DOCUMENTS

2006/0131399 A1* 6/2006 Bravo ............... G06Q 20/0652
235/382
2012/0017059 A1* 1/2012 Gold .................. G06F 11/1453
711/162
(Continued)

FOREIGN PATENT DOCUMENTS

| WO | 2013/088118 A1 | 6/2013 |
| WO | 2015/067809 A1 | 5/2015 |
| WO | 2015/121346 A1 | 8/2015 |

OTHER PUBLICATIONS

ETSI TR 102 661 V1.2.1, Technical Report, Lawful Interception (LI); Security framework in Lawful Interception and Retained Data environment, Nov. 2009.
(Continued)

*Primary Examiner* — Lisa C Lewis
(74) *Attorney, Agent, or Firm* — Myers Wolin, LLC

(57) ABSTRACT

A method is provided for securely and efficiently accessing connection data of at least one telecommunication provider is provided, wherein the connection data is ascertained by the telecommunication provider and is encrypted by the telecommunication provider, the encrypted connection data is transmitted from the telecommunication provider to a secured environment, the connection data is decrypted in the secured environment and, for a first predetermined time period, is stored as decrypted connection data exclusively in a volatile memory of the secured environment, and the access to the connection data is exclusively granted as access to the decrypted connection data stored in the volatile
(Continued)

memory of the secured environment via a predetermined interface of the secured environment.

6 Claims, 1 Drawing Sheet

(51) Int. Cl.
*G06F 12/14* (2006.01)
*H04L 9/08* (2006.01)
*H04L 9/06* (2006.01)

(52) U.S. Cl.
CPC .......... *H04L 9/0819* (2013.01); *H04L 9/0861* (2013.01); *H04L 63/0428* (2013.01); *H04L 63/061* (2013.01)

(56) References Cited

U.S. PATENT DOCUMENTS

| | | | | |
|---|---|---|---|---|
| 2012/0317379 | A1* | 12/2012 | Ali | G06F 13/28 711/158 |
| 2013/0262853 | A1* | 10/2013 | Arie | H04L 63/0428 713/150 |
| 2014/0040616 | A1* | 2/2014 | Barber | G06F 11/1453 713/168 |
| 2016/0255057 | A1 | 9/2016 | Jäger | |
| 2016/0350540 | A1 | 12/2016 | Jäger et al. | |
| 2017/0019873 | A1* | 1/2017 | Britt | G06F 16/22 |
| 2017/0041312 | A1* | 2/2017 | Luo | H04L 63/0442 |
| 2017/0220488 | A1* | 8/2017 | Balasubramonian | H03M 7/30 |

OTHER PUBLICATIONS

ETSI TS 102 656 V1.2.2, Lawful Interception (LI); Retained Data; Requirements of Law Enforcement Agencies for handling Retained Data, Sep. 2014.

International Search Report issued for corresponding International Patent Application No. PCT/EP2016/070053, dated Nov. 21, 2016.

English translation of the International Preliminary Report on Patentability with Written Opinion of the International Searching Authority for corresponding International Patent Application No. PCT/EP2016/070053 dated Mar. 6, 2018.

* cited by examiner

METHOD FOR SECURELY AND EFFICIENTLY ACCESSING CONNECTION DATA

CROSS REFERENCE TO RELATED APPLICATIONS

This application is a continuation of International Application No. PCT/EP2016/070053, filed on Aug. 25, 2016, which claims priority to German Application No. 10 2015 114 544.8, filed Aug. 31, 2015, the contents of each of which are incorporated by reference herein.

TECHNICAL FIELD

The invention relates to a method for securely and efficiently accessing connection data, which are ascertained by a telecommunication provider.

BACKGROUND

Connection data (also referred to as traffic data), in telecommunications, is the technical information that is incurred when using a telecommunication service (telephony, use of internet) by the telecommunication company or telecommunication provider, and that is ascertained, stored, processed, transmitted, and used by the latter, for example, the phone number of the connections as well as the time and location of a call.

When investigating criminal offences and/or for hazard prevention, connection data is a means used by governmental authorities. With respect to the so-called retention of data, the latter is to be stored without any initial suspicion so that this data, as soon as there is suspicion or a legitimate legal interest for information in hindsight, can be used for clarification purposes anyhow.

With respect to the retention of data, it is desired that access to such connection data is only available for authorized instances (e.g., certain governmental authorities). Further, it is desired that such an access also should be possible for the authorized instances within very narrow legal limits.

In prior art, it is known that telecommunication companies or telecommunication providers store such connection data, and provide access for the authorized instances, if needed. For improving the security, the connection data may be encrypted by the telecommunication company, and may be decrypted during access through an authorized instance by the telecommunication company. This, however, has the disadvantage that the telecommunication company is the owner of the keys for encryption, as well as it is the owner of the keys for the decryption such that the telecommunication company would be able to decrypt the connection data at any time without tangible cause. Moreover, with each authorized access to the connection data, all encrypted connection data has to be decrypted, in order to be able to search data in the connection data fulfilling certain criteria on, which, however, leads to higher limitations with respect to performance. Further, hereby it cannot be ensured that, on the one hand, the authorized instance, in fact, is only provided with the requested data, and on the other hand, that unauthorized employees of the telecommunication company do not have any access to the connection data.

SUMMARY

Therefore, the present invention is based on the object to provide solutions, which on the one hand, allow for secure storage of connection data, and on the other hand, allow for an efficient search of certain connection data. Moreover, it is a further object of the invention to prevent unauthorized access to connection data efficiently.

A method is provided for securely and efficiently accessing connection data of at least one telecommunication provider. Preferred embodiments and further developments of the method are defined in the dependent claims.

Accordingly, a method for securely and efficiently accessing connection data of at least one telecommunication provider is provided, wherein the connection data is ascertained by the telecommunication provider, and is encrypted by the telecommunication provider, the encrypted connection data is transmitted by the telecommunication provider into a secure environment, in the secured environment, the transmitted encrypted connection data is decrypted and is stored for a first predetermined time period as decrypted connection data exclusively in a volatile memory of the secured environment, and the access to the connection data is granted exclusively as access to the decrypted connection data stored in the volatile memory of the secured environment via a predetermined interface of the secured environment.

Thereby, the decrypted connection data is permanently and exclusively stored in the volatile storage (e.g., RAM) of the secured environment, thereby reducing the access times to the connection data substantially. Moreover, the decrypted connection data may be deleted particularly efficiently, if, for example, an unauthorized access to the secured environment is detected. Thus, the security of the decrypted connection data is increased substantially.

It is advantageous, if at least one encryption key is generated by a key automat in the secured environment, and for encrypting the connection data, is transmitted to the telecommunication provider.

Further, it is advantageous, if for decrypting the transmitted encrypted connection data, at least one decryption key is generated by the key automat in the secured environment, wherein the decryption key is stored exclusively within a volatile memory of the secured environment.

Thereby, it is ensured that only the encryption key has to leave the secured environment. The decryption keys exclusively remain within the secured environment. Since the decryption keys are also stored exclusively within a volatile memory, moreover, it is ensured that also the decryption keys can be deleted efficiently during a compromising attempt.

The connection data may be encrypted block-wise, and may be transmitted into the secured environment block-wise.

The decrypted connection data may comprise a number of data sets, wherein each data set comprises a number of data fields, and wherein each data set is stored for a first predetermined time period. A corresponding first time period may be assigned to each data set.

Each data field of the data sets may be stored independently of the first predetermined time period for a second predetermined time period within the volatile memory of the secured environment. A corresponding second time period may be assigned to each data field.

It is advantageous, if each data set is deleted after the expiration of the first predetermined time period and/or if each data field is deleted after the expiration of the second predetermined time period. Thereby, it is ensured that also upon an authorized access to the connection data, connection data that has already expired or certain details of the connection data cannot be read anymore.

The connection data may be encrypted immediately after having been ascertained, and transmitted into the secured environment.

Further, it is advantageous, if the connection data is deleted at the telecommunication provided after generating the encrypted connection data. Thereby, the connection data is only present in decrypted from in the secured environment.

The decrypted connection data may be stored in the secured environment in an In-Memory database.

The secured environment may be created in a sealed infrastructure, or as sealed infrastructure. The decryption key and the encryption key may comprise cryptographic keys.

According to an embodiment of the invention, the encrypted connection data may also be stored at the telecommunication provider, wherein the telecommunication provider preferably has no access to the decryption key being necessary for decrypting the connection data. Thereby, the connection data can be "securely stored" at the telecommunication provider without the telecommunication provider being able to access the data.

It is advantageous, if the decrypted connection data stored in the secured environment and the decryption key are replicated in at least a further secured environment, wherein the replication procedure preferably is performed in an encrypted manner.

Hereby, it may be advantageous, if
the replication procedure is carried out at predetermined points of time, and/or
the replication procedure is carried out during a detection of an unauthorized access to the secured environment, and after completion of the replication procedure, the decrypted connection data and the decryption key are deleted in the secured environment.

BRIEF DESCRIPTION OF THE DRAWINGS

Details and features of the invention as well as concrete embodiments of the invention can be derived from the following description in connection with the drawing.

DETAILED DESCRIPTION

Figure 1:
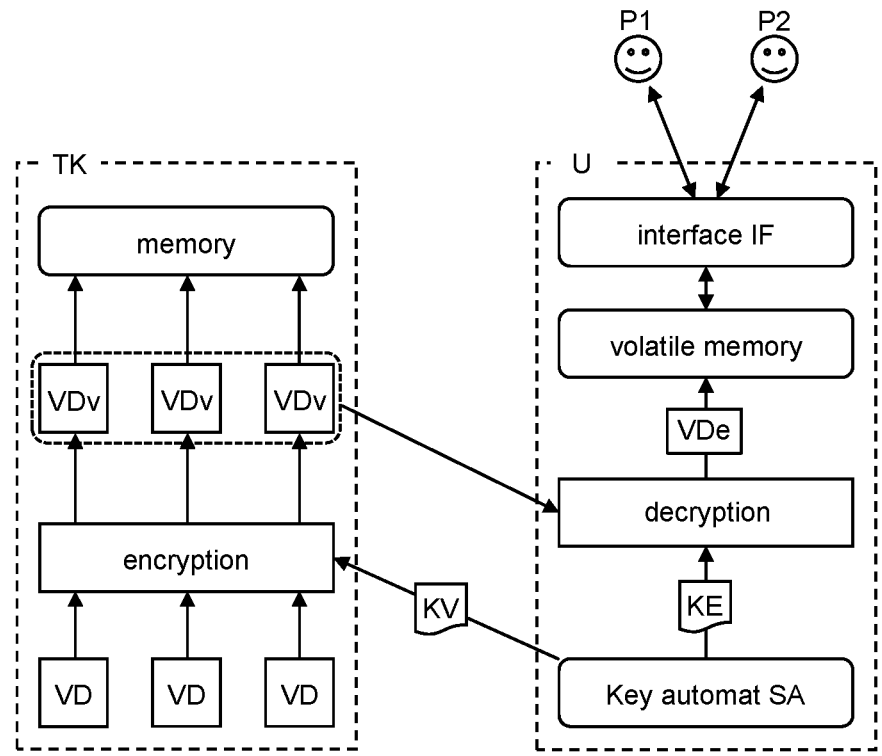
FIG. 1 shows an example of a system illustrating the method according to the invention.

FIG. 1 shows a system by means of which the method according to the invention will be explained in further detail.

A multitude of connection data VD is incurred at a telecommunication provider TK, which is generated at the telecommunication provider in the course of its telecommunication services provided, or which is required by the latter for fulfilling its services. This may be, for example, telephone numbers of the connections involved, as well as time, duration, and location of a call.

Some or all of the connection data VD has to be stored in the course of data retention, in order to be able to provide access to the connection data VD over a certain time period to authorized instances, as law enforcement authorities. It is provided for this connection data VD being stored within a secured environment U. The secured environment U may be implemented at the respective telecommunication provider TK. Alternatively, the secured environment U may also be implemented at an external service provider, or may be operated by the latter.

The secured environment U, preferably, is part of a sealed infrastructure, or is operated as sealed infrastructure. The secured environment U may comprise a number of redundant and distributed computer resources, which respectively comprise a number of so-called Trusted Platform Modules (TPM), circuit breakers for interrupting the power supply to the computer resources, electromechanical keys, a number of sensors, by means of which the access to the computer resources may be monitored.

According to an embodiment of the secured environment U, the computer re-sources may comprise memory devices, in which cryptographic keys are stored, wherein according to a preferred embodiment of the invention, the cryptographic keys are stored exclusively in volatile storage media such that after an interruption of the power supply, the stored keys are deleted. The deletion of the cryptographic keys may, for example, be necessary, if somebody gains unauthorized entry or access to the computer resource. The cryptographic keys necessary for the encryption and decryption of the connection data, here, are generated and managed by a key automat SA, which is operated within the secured environment U. Cryptographic keys for securing the data or connection between the secured environment U and the telecommunication provider TK may also be generated and managed by the key automat SA.

The connection data is also stored within the secured environment U in volatile storage media.

The computer resources of the secured environment U may be connected to a so-called sealing monitoring device, which monitors the electromechanical components. If the sealing monitoring device detects an unauthorized access to a computer resource, it may interrupt the power supply to the compromised computer source, whereupon the keys and the connection data are deleted in the volatile storage media. Thereby, it is ensured that neither decryption keys nor connection data can be extracted from a compromised computer source.

The access to the secured environment U exclusively takes place via an interface IF, which provides a predetermined number of access functions. Further, an authorization management may be implemented in the interface IF, by means of which the access to connection data may be controlled and monitored. The interface IF may be adapted so as to recognize unauthorized accesses, and, if needed, to initiate the interruption of the power supply.

This connection data VD being incurred at the telecommunication provider TK, at first, is present in non-encrypted form.

The non-encrypted connection data is encrypted (encryption) by the telecommunication provider TK. The encryption of the connection data may be carried out in an encryption unit. It may be provided for the encryption unit of the telecommunication provider TK providing the encryption keys KV necessary for this from the key automat SA of the secured environment. The encryption keys KV, moreover, are generated by the key automat SA of the secured environment. Further, the key automat SA also generates the decryption keys KE matching to the encryption key KV, which are required for the decryption of the connection data. Thereby, it is ensured that only the encryption key KV leaves the secured environment U. The decryption keys KE do not have to leave the secured environment U, because the decryption of the connection data takes place exclusively within the secured environment.

After the encryption of the connection data VD, the encrypted connection data VDv is transmitted by the telecommunication provider TK to the secured environment U. The transmission path between the telecommunication provider TK and the secured environment U provided for this, may also be secured crypto-graphically such that during the data transmission, an even higher security is ensured, because not only the connection data VDv to be transmitted is encrypted, but rather also the transmission path itself.

Additionally, the encrypted connection data VDv may be stored at the telecommunication provider TK in a memory. The memory provided for this may be configured as volatile and/or non-volatile memory. The storage of the encrypted connection data VDv at the telecommunication provider TK, however, is only an optional step.

The additional storage of the encrypted connection data VDv at the telecommunication provider TK, however, has the advantage that upon failure of the secured environment U and further redundant secured environments, the connection data may be reproduced again based on the encrypted connection data stored at the telecommunication provider TK, as far as the reading keys KE have not been lost in the secured environment U.

After the encrypted connection data VDv has been transmitted into the secured environment U, it is decrypted in the secured environment U. The decryption of the encrypted connection data VDv advantageously is carried out in a decryption unit. The decryption keys KE necessary for this are provided to the decryption unit by the key automat SA.

During the decryption procedure, the data exclusively is present in a volatile memory of the secured environment U. Thereby, it is ensured that upon an interruption of the power supply, for example, as a consequence of a compromising attempt, no non-encrypted fragments of the data to be decrypted remains anywhere on the non-volatile storage means.

After the encrypted connection data VDv has been decrypted in the secured environment U, it is stored in non-encrypted form (as decrypted connection data VDe) in a volatile memory of the secured environment U exclusively. This brings about several advantages: upon a compromising attempt, the decrypted connection data VDe is deleted immediately due to the initiated power supply interruption such that an attacker is no longer able to get hold of the connection data VDe; the (authorized) access to the decrypted connection data VDe may be carried out substantially faster, because the time for the decryption is omitted, and moreover, no expensive read accesses to permanent storage means (e.g., hard disks) are necessary. The main memory (RAM) of a data processing means may be provided as volatile memory. Since very large data amounts may be incurred during data retention, it is advantageous to provide a very large volatile memory, for example, several terabyte memories.

It is advantageous, if the decrypted connection data VDe is stored in an In-Memory database, according to which both the data storage as well as the data processing is carried out in the volatile memory. The use of In-Memory databases has the advantage that the functionality provided by the latter can be used. Thus, indices may be generated for the connection data VDe decrypted in the In-Memory data base, in order to further accelerate the selective access to the decrypted connection data VDe. Moreover, the decrypted connection data VDe may be partitioned according to certain criteria such that for certain queries, only a part of the decrypted connection data VDe has to be accessed.

According to an embodiment, it is provided for transmitting encrypted connection data VDv from the telecommunication provider TK to the secured environment U every time data is incurred at the telecommunication provider TK. Thereby, it is ensured that always the most up to date state of the connection data is stored in the secured environment U. Alternatively, the encrypted connection data VDv may be transmitted at fixed points of time or in fixed time intervals from the telecommunication provider TK into the secured environment U respectively.

According to a further embodiment, it is provided for transmitting the connection data in encrypted form and block-wise from the telecommunication provider TK into the secured environment U. The connection data, thereby, may be combined into blocks, and subsequently, the blocks may be encrypted. Alternatively, already encrypted connection data may be combined into blocks. These blocks are then split up accordingly within the decryption unit of the secured environment U, and are decrypted and stored as outlined above.

Authorized instances P1, P2, as law enforcement authorities, gain access to decrypted connection data VDe stored in the volatile memory of the secured environment U via the interface IF. The interface IF, hereby, checks whether the authorize instance is allowed to access data and in which form.

For the authorized instance, at the point of time of access, being only allowed to access the connection data stored in the secured environment U within the scope of its legal possibilities, it is provided for connection data being provided with a so-called expiration date. The expiration date may comprise a maximum storage duration (e.g., ten week) of the connection data, or a fixed date (e.g., 15 Dec. 2015).

The decrypted connection data VDe itself is stored in the volatile memory as data sets, wherein each data set may comprise a number of data fields. A first expiration date is assigned to each data set. After reaching the first expiration date, the corresponding data set is automatically deleted completely from the volatile memory. Thereby, it is ensured that even the authorized instances are no longer able to access such "expired" data. The automatic deletion of the "expired" data may be carried out cyclically, as each day at 12:00 o'clock and at 24:00 o'clock.

Further, it is provided for a second expiration date also being assigned to individual data fields of a data set. Either an absolute expiration date or a relative expiration date being determined on the basis of the first expiration date may be assigned to each data field. After reaching the second expiration date, the corresponding data fields of the data set are deleted automatically from the volatile memory completely. Thereby, it is ensured that the authorized instances only are able to access data fields of a data set, which has not yet expired.

All in all, by this it is ensured that only the legal data may be read at the point of time of a query.

The method, according to which the connection data in a non-encrypted form is exclusively stored in a volatile memory of a secured environment U, and according to which the encryption, the data transmission, and the decryption is executed as described above, besides the advantages mentioned above, moreover, has the following advantages:
  The response times for a query (retrieval of connection data in the secured environment U) decrease substantially. The response times without the method are obtained, as follows:

(transfer time for all data blocks)+(decryption of all data blocks)+(search in the decrypted data).

By storing the decrypted connection data in the RAM (volatile memory), the time for decryption is omitted. Similarly, the transfer time is omitted nearly completely.

The traffic load from the transfer of the data blocks from the telecommunication provider TK into the secured environment U decreases substantially. Only upon failure, as during a power outage or during an intended power supply interruption, the transfer of the entire data amount from the telecommunication provider TK into the secured environment U is necessary (as far as the data stored in the secured environment U has not been replicated). Normally, the data blocks newly generated at the telecommunication provider TK are transmitted continuously into the storage environment U.

Each data block, which has been transmitted from the telecommunication provider TK to the secured environment U, is decrypted immediately after the end of transfer. Thereby, the time for the decryption is omitted during the execution of a query.

The decrypted data VDe is stored for several queries in the volatile memory. Therefore, during reading, the additional expenditure for creating a structure, which is able to execute a query in a more efficient manner, as the storage of data in an In-Memory database, is justified. By generating indices on the data, the search is accelerated.

Figure 2:
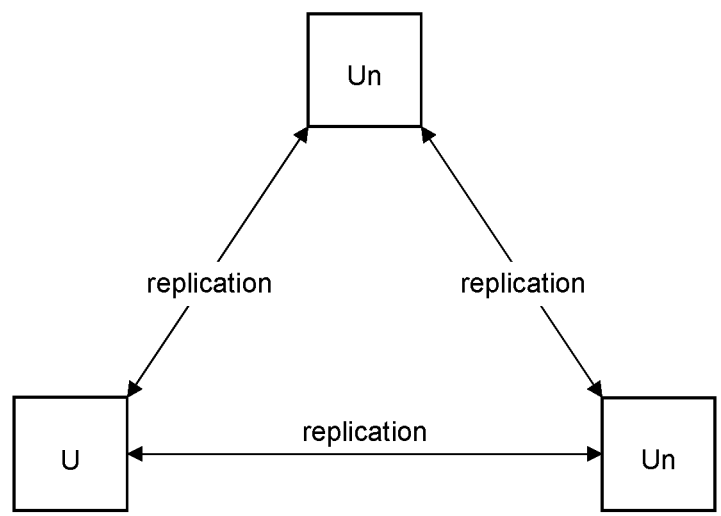
FIG. 2 shows an example with several secured environments illustrating a replication mechanism.

FIG. 2 shows an example for securing the data stored in a secured environment U. Since according to the embodiments described, it is provided for the connection data in a non-encrypted form only being allowed to be stored in a volatile memory of a secured environment U, a copy of this connection data for safety purposes may also be stored in a volatile memory exclusively.

In order to also ensure the same security requirements for the copy of this connection data, according to the embodiments described it is provided for the data being replicated in one or more further secured environments Un. However, the safety features of this further secured environment Un correspond at least to those of the secured environment U.

The further secured environments Un may also comprise an interface IF. Thereby, a further secured environment Un may be provided for queries, in case the secured environment U is not available, for example, during maintenance works.

If the one further secured environment Un is used only for data backup, the inter-face IF is not required.

The data exchange between the secured environments U and Un may be executed via cryptographically secured communication channels.

Upon failure of a secured environment U or Un (for example, if the power supply has been interrupted), the data may be generated again from another one of the others secured environments. Alternatively, the data may also be generated again from the encrypted original data VDv of the telecommunication provider TK, as far as the telecommunication provider TK stores it permanently, and the encryption keys KE have not been lost.

REFERENCE NUMERALS

IF interface
KE decryption key
KV encryption key
P1, P2 authorized person and person having the right for queries
S volatile memory (e.g., RAM)
SA key automated
t1 first predetermined time period (storage duration for a data set)
t2 second predetermined time period (storage duration for a data field)
TK telecommunication provider
U secured environment (sealed infrastructure)
Un further secured environment (s)
VD connection data (non-encrypted)
VDe connection data (decrypted)
VDv connection data (encrypted)

The invention claimed is:

1. A method for securely and efficiently accessing connection data of at least one telecommunication provider (TK), wherein the method comprises:
   the telecommunication provider ascertaining and encrypting connection data (VD),
   the telecommunication provider deleting the connection data after generation of the encrypted connection data (VDv),
   the telecommunication provider (TK) transmitting the encrypted connection data (VDv) to a secured environment (U) that is in a sealed infrastructure,
   wherein the secured environment comprises a volatile memory (S), a key unit (SA), which is software adapted to generate and manage cryptographic keys necessary for an encryption and a decryption of the connection data (VD) and for securing a connection between the secured environment (U) and the telecommunication provider (TK), and a predetermined interface (IF),
   the key unit (SA) generating at least one encryption key (KV) in the secured environment (U),
   transmitting each of the at least one encryption key (KV) to the telecommunication provider (TK) for encrypting the connection data (VD),
   the key unit (SA) generating at least one decryption key (KE), matching to the at least one encryption key (KV), in the secured environment (U) for decrypting the encrypted connection data (VDv) transmitted, wherein the at least one decryption key (KE) is stored exclusively in the volatile memory (S) of the secured environment (U),
   decrypting the connection data (VDv) in the secured environment (U) and, for a first predetermined time period (t1), storing the connection data as decrypted connection data (VDe) exclusively in a volatile memory (S) of the secured environment (U), and
   the predetermined interface (IF) of the secured environment (U) providing exclusive access to the decrypted connection data (VDe) stored in the volatile memory (S) of the secured environment (U).

2. The method of claim 1, wherein the connection data (VD) is encrypted block-wise, and is transmitted into the secured environment (U) encrypted block-wise.

3. The method of claim 1, wherein the decrypted connection data (VDe) comprises a number of data sets, wherein each data set comprises a number of data fields, wherein each data set is stored for the first predetermined time period (t1), and wherein each data field of the data sets is stored for a second predetermined time period (t2), which can be smaller than or equal to the first predetermined time period (t1), in the volatile memory (S) of the secured environment (U), and wherein after expiration of the first predetermined time period (t1), each data set is deleted.

4. The method of claim 3, wherein each data field is deleted after expiration of the second predetermined time period (t2).

5. The method of claim 1, wherein the decrypted connection data (VDe) is stored in an In-Memory database.

6. The method of claim 1 wherein the decryption key (KE) and the encryption key (KV) comprise cryptographic keys.

* * * * *